United States Patent
Kanou et al.

[11] Patent Number: 5,913,972
[45] Date of Patent: *Jun. 22, 1999

[54] AQUEOUS PIGMENT DISPERSION, WATER-SOLUBLE RESIN, PRODUCTION PROCESS OF THE RESIN, AND EQUIPMENT SUITABLE FOR USE WITH THE DISPERSION

[75] Inventors: Kazuo Kanou; Jiro Amano; Naoyuki Sakai, all of Tokyo, Japan

[73] Assignee: Dainichiseika Color & Chemicals Mfg. Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/839,786

[22] Filed: Apr. 16, 1997

[30] Foreign Application Priority Data

Apr. 22, 1996 [JP] Japan .................................. 8-122811

[51] Int. Cl.$^6$ ............................. C09D 11/10; C08L 67/00; C08G 63/688
[52] U.S. Cl. .................................... 106/31.87; 106/31.89; 523/161; 524/603; 528/293
[58] Field of Search ........................... 523/161; 524/603, 524/845; 106/31.89, 31.87

[56] References Cited

U.S. PATENT DOCUMENTS 3,816,378  6/1974  Schmadel ........................ 525/447
5,281,630  1/1994  Salsman ........................... 524/603
5,464,883  11/1995  Sharma et al. ................... 523/161
5,679,724  10/1997  Sacripante et al. .............. 524/845
5,716,436  2/1998  Sorriero et al. .................. 523/161

Primary Examiner—Tae Yoon
Attorney, Agent, or Firm—Oblon, Spivak, McClelland, Maier & Neustadt, P.C.

[57] ABSTRACT

An aqueous pigment dispersion is formed of a pigment, an aqueous medium and a dispersant resin. The dispersant resin contains a hydrophobic moiety and a hydrophilic moiety in its molecule. The hydrophobic moiety is a polyester linkage chain formed of ester linkages as primary linkages. The hydrophilic moiety is a water-soluble resin containing sulfonic groups or their salts. The water-soluble resin can be produced, for example, by reacting a polyol with maleic acid and/or fumaric acid to synthesize an unsaturated polyester resin and then adding acid sulfurous acid or its salt to the unsaturated polyester resin to form groups represented by the following formula (I):

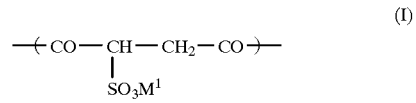

wherein $M^1$ represents a hydrogen atom, an alkali metal, an ammonium group or a lower aliphatic quaternary ammonium group. The aqueous pigment dispersion is useful as a water-based ink for writing or recording equipments such as writing instruments, printers, copying machines, fax machines and printing machines.

8 Claims, No Drawings

AQUEOUS PIGMENT DISPERSION, WATER-SOLUBLE RESIN, PRODUCTION PROCESS OF THE RESIN, AND EQUIPMENT SUITABLE FOR USE WITH THE DISPERSION

BACKGROUND OF THE INVENTION a) Field of the Invention

This invention relates to an aqueous pigment dispersion, and especially to an aqueous pigment dispersion useful in printing, recording, drawing, stamping or otherwise presenting characters, patterns or pictures (hereinafter collectively called "marks") on paper, films or sheets by writing instruments, recording equipments or the like which make use of capillary phenomena. The present invention is also concerned with a water-soluble resin useful for the preparation of the aqueous pigment dispersion, a production process of the water-soluble resin, and an equipment suitable for use with the aqueous pigment dispersion.

b) Description of the Related Art

Aqueous pigment dispersions—each of which makes use of an acrylic resin, which contains carboxyl groups as solubilizing groups, as a pigment-dispersing resin—have conventionally been used as water-based pigment inks for plastic-fiber-tip pens, felt-tip pens, inkjet printers and the like for their high dispersion stability and also owing to good waterproofness and durability of written or recorded marks.

Marks of such a water-based pigment ink are superior in fastness such as waterproofness and light resistance to marks of a dye-based ink, but in terms of the vividness and density of a color of marks or the gloss of marks written or recorded on a non-absorptive surface, the former are inferior to the latter. These drawbacks can be attributed to the use of capillary phenomena by a writing instrument or recording equipment in which such a water-based pigment ink is used. To permit the use of capillary phenomena, the ink is required to have low viscosity. To provide the ink with low viscosity, the ink is prepared by using a pigment-dispersing resin in a smaller amount.

A water-based pigment ink desired for such applications is supposed to have high density and low viscosity and, when written or recorded on a liquid-absorptive surface, also to exhibit high surface tension. Moreover, the dispersion of the pigment in the water-based pigment ink does not change and remains stable with time, and written or recorded marks have a vivid color and are excellent in waterproofness, light resistance and other durability.

For the vividness of a color of marks and the settling stability of a pigment in a water-based pigment ink (i.e., the resistance of the pigment to settling during storage), the pigment is desirably in the form of fine particles. To achieve uniform dispersion of such fine pigment particles in an aqueous medium, use of a pigment-dispersing resin is needed. Concerning the ratio of the pigment-dispersing resin to the pigment to be used, there is an optimal value in view of the dispersibility, dispersion stability and color-developing ability of the pigment. Although this optimal value also varies depending on the type of the pigment, the pigment-dispersing resin has to be used in a greater amount as the particle size of the pigment becomes smaller.

To obtain a water-based pigment ink of high pigment concentration and low viscosity by using a fine particulate pigment, the molecular weight of a pigment-dispersing resin must therefore be lowered. However, a certain higher molecular weight is desired for a pigment-dispersing resin from the standpoint of dispersion stability of a pigment with time.

Carbon black has been used as a black pigment for many years, and features excellent density and durability as its advantages. Due to its extremely small particle size, however, the molecular weight of a pigment-dispersing resin must be lowered in order to fully disperse it in an aqueous medium. Nevertheless, conventionally-known, pigment-dispersing resins are each accompanied by a problem that the dispersion stability of a pigment is reduced if the molecular weight is lowered.

Further, a condensation product between sodium naphthalenesulfonate and formaldehyde, which has conventionally been used as a dispersant for pigments, is excellent in pigment dispersibility and the dispersion stability of pigment dispersions and permits preparation of an aqueous pigment dispersion of high concentration. The condensation product is however accompanied by a problem that written or recorded marks are poor in waterproofness and also a problem that good writing comfort cannot be enjoyed due to excessively sluggish flow property of the dispersion. Mere writing ability is not sufficient for a writing instrument. It is important for a writing instrument to permit writing with feeling which is in conformity with the user's desire or taste. Writing comfort is therefore an important property for writing instruments.

Keeping in step with the recent advancements in ink-jet printing and jet printing machines and the recent popularization of on-demand printing, there is an ever-increasing demand for the development of a water-based pigment ink which has high pigment concentration and low viscosity and has overcome the above-described problems of the conventional art.

SUMMARY OF THE INVENTION

An object of the present invention is therefore to provide an aqueous pigment dispersion having excellent quality, especially a writing or recording, aqueous pigment dispersion which has high pigment concentration and low viscosity, assures excellent writing comfort, produces written or recorded marks excellent in color vividness and also in durability such as waterproofness, and has excellent pigment dispersion stability with time. Another object of the present invention is to provide a water-soluble resin useful for the preparation of the dispersion.

With a view to overcoming the above-described problems of the conventional water-based pigment inks, the present inventors have proceeded with an extensive investigation. As a result, it has been found that the above objects can be attained by using a particular resin, which contains sulfonic groups or sulfonate salt groups as solubilizing groups, for the dispersion of a pigment, leading to the present invention.

In one aspect of the present invention, there is thus provided an aqueous pigment dispersion comprising a pigment, an aqueous medium and a dispersant resin, wherein the dispersant resin contains a hydrophobic moiety and a hydrophilic moiety in its molecule, the hydrophobic moiety is a polyester linkage chain formed of ester linkages as primary linkages, and the hydrophilic moiety is a water-soluble resin containing sulfonic groups or sulfonate salt groups.

In another aspect of the present invention, there is also provided a water-soluble resin comprising groups, which are represented by the following formula (I) or (II), as water-soluble groups in a backbone or side chains:

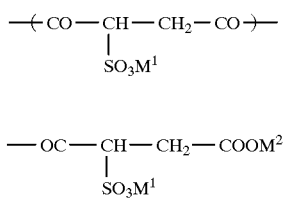

wherein $M^1$ represents a hydrogen atom, an alkali metal, an ammonium group or a lower aliphatic quaternary ammonium group, and $M^2$ represents a hydrogen atom, an alkali metal, an ammonium group, a lower aliphatic quaternary ammonium group or a lower alkyl group.

In a further aspect of the present invention, there is also provided a process for the production of a water-soluble resin, which comprises reacting a polyol with maleic acid and/or fumaric acid to synthesize an unsaturated polyester resin, and then adding acid sulfurous acid or a salt thereof to the unsaturated polyester resin to form groups represented by the following formula (I):

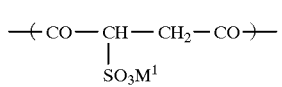

wherein $M^1$ represents a hydrogen atom, an alkali metal, an ammonium group or a lower aliphatic quaternary ammonium group.

In a still further aspect of the present invention, there is also provided a coloring or recording equipment, for example, a writing instrument, a printer, a copying machine, a fax machine or a printing machine, wherein the equipment is provided with the aqueous pigment dispersion.

The aqueous pigment dispersion according to the present invention can be prepared with excellent quality, especially with high concentration and high surface tension. When filled in a writing instrument and used in writing or when employed for printing by an ink-jet printer or the like, the aqueous pigment dispersion permits clear writing or recording without blurring or without smear around the written or recorded marks.

The aqueous pigment dispersion according to the present invention provides handwriting or recorded marks having excellent waterproofness and durability, and is equipped with excellent printability so that, even when writing by a writing instrument filled with the dispersion or recording by a recording equipment such as a printing machine is interrupted, no clogging takes place at a tip of the writing instrument or recording equipment.

The water-soluble resin useful in the practice of the present invention is useful not only as a dispersant resin for pigments but also as a component for water-based paints or water-based adhesives.

DETAILED DESCRIPTION OF THE INVENTION AND PREFERRED EMBODIMENTS

An aqueous pigment dispersion according to the present invention is formed of a pigment, an aqueous medium and a dispersant resin. The dispersant resin employed in the aqueous pigment dispersion contains a hydrophobic moiety and a hydrophobic moiety in its molecule. The hydrophobic moiety is a polyester linkage chain formed of ester linkages as primary linkages, while the hydrophilic moiety is a water-soluble resin containing sulfonic groups or sulfonate salt groups. The resin can be obtained, for example, by reacting a diol with a polycarboxylic acid containing at least one sulfonic group or sulfonate salt group and 2 to 4 carboxyl groups in a molecule.

It is possible to adjust the degree of water solubility of the resulting resin by copolymerizing a polycarboxylic acid which does not contain sulfonic groups or sulfonate salt groups. If the polycarboxylic acid free of sulfonic groups or sulfonate salt groups is used as the whole polycarboxylic acid, sulfonic groups or sulfonate salt groups can be introduced into the resultant polyester resin subsequent to its production. Each of these resins is formed of a hydrophobic moiety and a hydrophilic moiety, the hydrophobic moiety is a polyester linkage chain formed primarily of ester linkages and the hydrophilic moiety contains sulfonic groups, sulfonic groups and carboxylic groups, or sulfonate salt groups. The raw material components of the above-described polyester resin will hereinafter be described specifically.

Examples of the diol include aliphatic diols such as ethylene glycol, diethylene glycol, triethylene glycol, propylene glycol, dipropylene glycol, tripropylene glycol, 1,4-butanediol, 1,6-hexandiol and neopentyl glycol; aromatic diols such as dihydroxymethylbenzene; alicyclic diols such as cyclohexanedimethanol; and alkylene oxide (ethylene oxide, propylene oxide, etc.) adducts of bisphenols, such as bisphenol-dihydroxyethyl ether and bisphenol-dihydroxypropyl ether. Illustrative of the bisphenols are bisphenol A, bisphenol F, bisphenol AF, bisphenol S and the like. These diols can be used either singly or in combination.

Examples of the dicarboxylic acid containing sulfonic groups or sulfonate salt groups include sulfoaromatic dicarboxylic acids such as 5-sodiumsulfoisophthalic acid, 2-sodiumsulfoterephthalic acid and 2-potassiumsulfoterephthalic acid. They can also be used either singly or in combination.

Examples of the polycarboxylic acid free of sulfonic groups or sulfonate salt groups include aromatic dicarboxylic acids such as phthalic acid, isophthalic acid and terephthalic acid; saturated or unsaturated dicarboxylic acids such as sebacic acid, adipic acid, maleic acid and fumaric acid; aromatic tricarboxylic acids such as trimellitic acid, and a Diels-Alder adduct between abietic acid and maleic anhydride; and aromatic tetracarboxylic acids such as pyrromellitic acid, naphthalenetetracarboxylic acid, biphenyltetracarboxylic acid and benzophenonetetracarboxylic acid. These polycarboxylic acids can be used either singly or in combination.

The water-soluble resin employed in the present invention can be obtained by reacting the above-described diol with a polycarboxylic acid, which contains at least one sulfonic group or sulfonate salt group and 2 to 4 carboxylic groups in a molecule, by a process known per se in the art. It can also be obtained by condensing the above-described diol with an unsaturated polycarboxylic acid, for example, maleic acid, maleic anhydride or fumaric acid or with a derivative thereof such as a lower alkyl ester or an acid halide thereof to synthesize an unsaturated polyester resin and then adding acid sodium sulfite to the unsaturated polyester resin to introduce sulfosuccinate ester groups [i.e., groups represented by the below-described formula (I)] into the resin. In this case, another polycarboxylic acid or a polycarboxylic acid containing sulfonic groups or sulfonate salt groups can also be used in combination with the above-described unsaturated polycarboxylic acid.

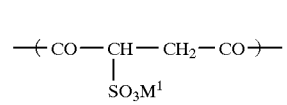

(I)

wherein $M^1$ represents a hydrogen atom, an alkali metal, an ammonium group or a lower aliphatic quaternary ammonium group.

As an alternative to the above-described process, it is also possible to produce a water-soluble resin, which contains groups represented by the below-described formula (II), by reacting maleic anhydride with a hydroxyl-containing resin and then adding acid sodium sulfite or the like.

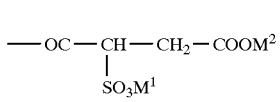

(II)

wherein $M^1$ has the same meaning as defined above and $M^2$ represents a hydrogen atom, an alkali metal, an ammonium group, a lower aliphatic quaternary ammonium group or a lower alkyl group.

In this case, the resin is not limited to the above-described polyester resin. As the hydroxyl-containing resin, for example, it is possible to use, for example, an acrylic resin copolymerized with a hydroxyalkyl(meth)acrylate or an acetophenone-formaldehyde resin. In this manner, it is also possible to obtain a water-soluble resin containing, as water-solubilizing groups, sulfosuccinate ester groups or sulfonate salt groups in a backbone or side chains. Incidentally, the water-soluble resin employed in the present invention may also contain, in the aliphatic moiety, carboxyl groups and/or hydroxyl groups in addition to sulfonic groups or sulfonate salt groups.

In the definitions of $M^1$ and $M^2$ the alkali metal can preferably be lithium, sodium or potassium; the lower aliphatic quaternary ammonium group can desirably be a quaternized cation of mono-, di- or tri-methylamine, mono-, di- or tri-ethylamine, mono-, di- or tri-propylamine, mono-, di- or tri-butylamine, mono-, di- or tri-ethanolamine, or mono-, di- or tri-propanolamine; and the lower alkyl group can preferably be a $C_{1-14}$ alkyl group.

Upon synthesis of the water-soluble resin employed in the present invention, a solvent can be used as needed. Preferred as the solvent is a water-soluble solvent and, especially when an aqueous pigment dispersion is prepared by the water-soluble resin, a solvent which does not lower the surface tension of the resulting aqueous pigment dispersion. Illustrative are diethylene glycol monomethyl ether and diethylene glycol monoethyl ether. A water-insoluble solvent may also be used. In this case, however, it is desired to eliminate the water-insoluble solvent subsequent to the synthesis of a resin.

The water-soluble resin, which is obtained as described above and is used in the present invention, contains sulfonic groups or sulfonate salt groups. When the resin is used as a dispersant for a writing or recording pigment, no particular limitation is imposed on the content of the sulfonic groups or sulfonate salt groups insofar as the resin can function as a dispersant for the pigment. However, the preferred content of sulfonic groups or sulfonate salt groups is in a range of from 3 to 30wt. %. If the content of sulfonic groups or sulfonate salt groups is lower than the above-described range, the pigment in the resulting aqueous pigment dispersion cannot be provided with sufficient dispersion stability so that, when the dispersion is used for writing, the writing comfort will not be of any satisfactory level. Such a low content is therefore not preferred. If the content is higher than the above-described range, on the other hand, marks written or recorded with the resulting aqueous pigment dispersion will not be sufficient in waterproofness. Such a high content is therefore not preferred.

Further, when the water-soluble resin useful in the practice of the present invention is used as a pigment-dispersing resin, its preferred molecular weight ranges from 600 to 10,000. A molecular weight lower than 600 leads to insufficient dispersion stability of the pigment and also to written marks insufficient in scuff fastness. A molecular weight higher than 10,000 makes it difficult to increase the concentration of the pigment in the aqueous pigment dispersion and in ink-jet printing or jet printing, flying of ink droplets becomes unstable due to stringiness caused of the high molecular weight of the pigment-dispersing resin. Molecular weights outside the above range are therefore not preferred. A more preferred molecular range is from 1,000 to 6,000.

If necessary, the water-soluble resin employed in the present invention can be used after neutralizing it with a neutralizing agent. Usable examples of the neutralizing agent include alkali metal compounds such as sodium compounds, potassium compounds and lithium compounds; ammonia; and amines.

The writing or recording, aqueous pigment dispersion according to the present invention can be obtained by mixing the above-described pigment-dispersing water-soluble resin, the pigment and water and if needed, a water-soluble organic solvent and dispersing the pigment. If necessary, the aqueous pigment dispersion so obtained may preferably be subjected to centrifugation or the like so that coarse particles, which may be contained in the dispersion, can be eliminated.

As the pigment employed in the present invention, conventionally-known pigments are all usable. They include, for example, organic pigments such as phthalocyanine, azo, condensed azo, anthraquinone, perinone/perylene, indigo/thioindigo, isoindolinone, quinophthalone, azomethine, azomethineazo, dioxazine, quinacridone, aniline black, and triphenyl methane pigments; and inorganic pigments such as carbon black, titanium oxide, iron oxide, iron hydroxide, calcined spinnel, and metal powder pigments.

In the present invention, it is desired to suitably choose the type and particle size of the pigment and the manner of pigment processing depending on the application purpose of the writing or recording, aqueous pigment dispersion. Unless hiding power is required for marks to be formed, it is generally preferred to use a fine particulate organic pigment. Use of an organic pigment having a particle size of 0.5 μm or smaller is desired especially when transparency is desired for marks.

To the writing or recording aqueous pigment dispersion according to the present invention, it is possible to add, together with the above-described components, ionic or nonionic, pigment-dispersing resins other than those indispensable for the present invention, dispersants, thickeners, drying inhibitors such as urea, rust preventives such as benzotriazole, lubricants, ultraviolet absorbers, water-soluble solvents, surfactants, anti-settling agents, mold protecting agents and/or the like as needed.

Incidentally, when an additive such as a drying inhibitor is used in a form dissolved in a water-soluble organic solvent, it is desired to use an organic solvent having large surface tension. Preferred examples include ethylene glycol, diethylene glycol, triethylene glycol and glycerin.

As water which is usable as an aqueous medium in the present invention, deionized water is desired. Tap water can also be used if its hardness is sufficiently low. When underground water or industrial water is used, it is necessary to pay sufficient attention to metal ions. In some instances, use of an ion scavenger may be desired.

The contents of the pigment and the dispersant resin in the aqueous pigment dispersion according to the present invention vary depending on the application purpose of the dispersion. In general, however, the concentration of the pigment can range from 0.5 to 50 wt. % and the concentration of the dispersant resin can range from 1 to 25 wt. %.

For the preparation of the aqueous pigment dispersion according to the present invention, conventional dispersers which have been used for the preparation of aqueous dispersions are all usable. In particular, a ball mill is of a closed construction and is a preferred disperser. It is desired to use a porcelain ball mill with a rubber lining applied to the main body, although a ball mill made of stainless steel is also usable provided that sufficient care is exercised. Further, a continuous disperser making use of a tumbling medium is of a semi-closed construction, and use of glass beads as the tumbling medium can avoid mixing of rust and metal chips into the resulting pigment dispersion. This disperser is also suited for use in the practice of the present invention.

Using the above-described disperser, the aqueous pigment dispersion according to the present invention is usually prepared as an aqueous dispersion containing the pigment and the dispersant resin as principal components and having a viscosity of from about 30 to 3,000 cps. For use in writing instruments or recording equipments, it is diluted to a desired viscosity of 10 cps or lower suited for each application. Additives are usually added at the time of this dilution. Further, coarse particles and the like can be classified out by a centrifugator or the like after the dilution as needed.

As is appreciated from the foregoing, the aqueous pigment dispersion according to the present invention is useful as a colored matter for writing instruments such as ball-point pens, plastic-fiber-tip pens, felt-tip pens, fountain pens and fountain brush pens; other stationery goods such as stamps, Indian ink and colors; and information recording equipments such as ink-jet printers, copying machines and fax machines. Further, the water-soluble resin useful in the practice of the present invention is also useful for water-based paints, water-based adhesives and the like, in addition to its utility as a dispersant resin for the above-described pigment.

The present invention will hereinafter be described more specifically by the following examples, comparative examples and referential examples, in which all designations of "part or parts" and "%" mean "part or parts by weight" and "wt. %", respectively.

EXAMPLE 1

In a reaction vessel, 127 parts of 5-sodiumsulfoisophthalic acid and 190 parts of bisphenol A-dihydroxypropyl ether were placed. While reducing the pressure to 50 mmHg, they were condensed at 150 to 250° C. for 6 hours under stirring. Diethylene glycol monoethyl ether (100 parts) was then added to the reaction mixture and, after the resultant mixture was cooled to 90° C., 600 parts of water were added. The resulting mixture was cooled under stirring, whereby a resin solution was obtained. The solid content of the resin solution was 30%. The thus-formed resin had an acid value of 3.68 as measured based on remaining carboxyl groups, which is equivalent to a number average molecular weight of 3,040. The content of sulfonic groups in this resin was 12.6% based on the resin.

The above-described resin solution (130 parts), water (260 parts) and carbon black (130 parts) were placed in a mixing vessel and were then stirred and mixed there. Using a horizontal disperser with a tumbling medium contained therein, the pigment (i.e., carbon black) was thoroughly dispersed in the mixture. Water (280 parts) was added, followed by thorough stirring. Coarse particles were removed by an ultra-centrifugal separator, whereby an aqueous pigment dispersion (water-based pigment ink) having a viscosity of 3.8 cps was obtained.

This water-based pigment ink was filled in a plastic-fiber-tip pen which was designed for use with a water-based ink. Using the plastic-fiber-tip pen, characters were written on a wood free paper sheet. With good writing comfort, blur-free clear handwriting was obtained. Further, the handwriting had sufficient density. The plastic-fiber-tip pen with the water-based pigment ink filled therein was left over for 1 month with the tip portion directed upwards in a capped state. Characters were then written. No difference was observed in density between handwriting at the beginning and that at the end.

EXAMPLE 2

In a reaction vessel, 65.1 parts of 5-sodium-sulfoisophthalic acid and 196.2 parts of bisphenol A-dihydroxyethyl ether were placed. While reducing the pressure to 50 mmHg, they were condensed at 150 to 250° C. for 6 hours under stirring. The reaction mixture was then cooled to 80° C., followed by the addition of 200 parts of methyl ethyl ketone (MEK) and 39.7 parts of pyromellitic anhydride. They were reacted at 90° C. for 6 hours under stirring (the thus-formed resin had an acid value of 72.85, which is equivalent to a number average molecular weight of 4,750). The thus-obtained reaction mixture was cooled to 80° C., to which 493.7 parts of water and 14.6 parts of caustic soda were added. The resultant mixture was thoroughly stirred until it was neutralized. The mixture was then heated to 90° C., at which a large majority of the MEK was eliminated. Under reduced pressure, the remaining MEK was fully removed as an azeotropic mixture with water. Water was added to the thus-obtained resin solution to adjust its solid content to 30%. The content of sulfonic groups in the resin was 6.5% based on the resin.

The above-described resin solution (120 parts), water (255 parts), carbon black (120 parts), benzo-triazole (5 parts) and ethylene glycol (200 parts) were placed in a mixing vessel and were then stirred and mixed there. Using a horizontal disperser with a tumbling medium contained therein, the pigment (i.e., carbon black) was thoroughly dispersed in the mixture. Water (300 parts) was then added, followed by thorough stirring. Coarse particles were removed by an ultra-centrifugal separator, whereby a water-based pigment ink was obtained.

This water-based pigment ink was filled in a ball-point pen which was designed for use with a water-based ink. Using the ball-point pen, characters were written on a wood free paper sheet. With good writing comfort, handwriting of sufficient density was obtained. Water was spilt over the handwriting immediately after the writing, but the handwriting remained free from blurring. Accordingly, this water-based pigment ink can be considered to be a water-based pigment ink suited for long-term recording purposes. This water-based pigment ink was stored at 50° C. for 1 month, but no changes were observed.

EXAMPLE 3

An acetophenone-formaldehyde resin ("Hylak 110H", trade name; product of Hitachi Chemical Co., Ltd.) (141.5 parts) and maleic anhydride (76 parts) were dissolved in 200 parts of MEK, followed by heating to 80° C. To the thus-obtained solution, 79 parts of triethylamine were added dropwise over 2 hours. The thus-obtained mixture was again heated at 80° C. for 5 hours under stirring. Water (500 parts) was added, followed by the azeotropic removal of a large majority of the MEK under heat. Acid sodium sulfite (82.5 parts) was added to the resultant solution, followed by a reaction at 95 to 97° C. for 6 hours under stirring. Water was added to the reaction mixture to adjust its solid content to 30%, whereby a resin solution having a viscosity of 2,250 cps was obtained. The content of sulfonic groups in the resin was 21.2%.

The above-described resin solution (180 parts), water (300 parts) and cyanine blue (180 parts) were placed in a mixing vessel and were then stirred and mixed there. Using a horizontal disperser with a tumbling medium contained therein, the pigment (i.e., cyanine blue) was thoroughly dispersed in the mixture. Water (340 parts) was then added, followed by thorough stirring. Coarse particles were removed by an ultra-centrifugal separator, whereby a water-based pigment ink was obtained.

Using a marking pen with the water-based pigment ink filled therein, characters were written on a wood free paper sheet. The handwriting had sufficient density without through-out. The marking pen was capped and was left over for 1 month with the writing portion directed upwards. The marking pen was then used again. Writing was feasible without any problem.

EXAMPLE 4

In a reaction vessel, 169.6 parts of hydrogenated bisphenol A and 47 parts of maleic anhydride were placed, followed by a reaction at 120° C. for 4 hours under stirring. Paratoluenesulfonic acid (1 part) was added, followed by dehydrating condensation at a reduced pressure of 50 mmHg and 140° C. for 8 hours under stirring. Trimellitic anhydride (92.1 parts) was then added, followed by a reaction under atmospheric pressure at 120° C. for 6 hours with stirring. The thus-formed resin had an acid value of 182.5.

The above-described reaction mixture was cooled to 90° C., followed by the addition of a mixture consisting of 592.4 parts of water and 57.6 parts of 28% aqueous ammonia. A neutralization reaction was then conducted at 60° C. under stirring for 30 minutes. Acid sodium sulfite (49.9 parts) was then added and, after heating the resultant mixture to 95 to 97° C., was reacted under stirring for 8 hours. The resultant resin solution had a solid content of 35% and a viscosity of 13,800 cps. The number average molecular weight of the thus-formed resin was 1,327, and the content of sulfonic groups in the resin was 11.7% based on the resin.

After the above-described resin solution (100 parts), water (250 parts) and carbon black (100 parts) were fully dispersed by using a horizontal disperser with a tumbling medium contained therein, 200 parts of glycerin and 350 parts of water were added. The resultant mixture was then thoroughly stirred. Coarse particles were removed by an ultracentrifugal separator, whereby a water-based pigment ink was obtained. Using the water-based pigment ink, printing was performed on wood free paper sheets by a jet printer under control of a personal computer. Blur-free clear images were obtained. No smear was observed around the images. The water-based pigment ink was stored at 50° C. for 1 months, but no changes were observed.

EXAMPLE 5

In a reaction vessel, 197.8 parts of a condensation product between sebacic acid and cyclohexane-dimethanol at a 1:2 molar ratio, 57.5 parts of fumaric acid and 1.2 parts of paratoluenesulfonic acid were placed and were then subjected to dehydrating condensation at 140 to 160° C. for 6 hours under stirring. The acid value of the resulting resin was 71.3. The reaction mixture was cooled to 90° C., followed by the addition of a mixed solution consisting of 682.6 parts of water and 17.4 parts of 28% aqueous ammonia. A neutralization reaction was then conducted at 60° C. under stirring for 30 minutes. Acid sodium sulfite (60.4 parts) was added to the thus-obtained semiclear resin solution and, the resulting mixture was heated at 95 to 97° C., was reacted under stirring for 8 hours. The solid content and viscosity of the thus-obtained resin solution were 30% and 1,620 cps. The number average molecular weight of the thus-formed resin was 1,878, and the content of sulfonic groups in the resin was 15.5% based on the resin.

The above-described resin solution (150 parts), water (225 parts), diethylene glycol (100 parts), benzotriazole (5 parts) and an insoluble azo pigment (180 parts) were mixed. Using a horizontal disperser with a tumbling medium contained therein, the pigment was then thoroughly dispersed in the mixture. Water (240 parts) and ethylene glycol (100 parts) were added to the resultant dispersion, followed by thorough stirring. Coarse particles were removed from the dispersion by an ultracentrifugal separator, whereby a water-based pigment ink was obtained.

Using a ball-point pen with this water-based pigment ink filled therein, characters were written on a wood free paper sheet. With good writing comfort, handwriting of sufficient density was obtained without blurring. The thus-obtained handwriting was immersed in water immediately after the writing, but no dissolution of the pigment was observed. The water-based pigment ink was stored at 50° C. for 1 month, but no changes were observed.

EXAMPLE 6

Fumaric acid (630 parts), bisphenol A-dihydroxyethyl ether (1,470 parts) and paratoluenesulfonic acid (10.5 parts) were placed in a reaction vessel. Under nitrogen gas stream, they were heated to 130° C. and then to 180° C. over 5 hours, followed by stirring at 180° C. for 90 minutes so that they were subjected to a condensation reaction to synthesize a polyester resin. The thus-synthesized resin was taken out of the reaction vessel. The resin (209 parts), water (620 parts) and 28% aqueous ammonia (20 parts) were placed in a reaction vessel, followed by stirring at 65° C. for 90 minutes. As a result, a semiclear resin dispersion was obtained. Acid sodium sulfite (62 parts) was added to the resin dispersion, followed by stirring at 95° C. for 6 hours so that the resin was sulfonated. Upon addition of 4 parts of water and 1 part of aqueous ammonia to the reaction mixture, a clear resin solution was obtained. The resin solution had a resin content of 30%. The viscosity of the resin solution was 530 millipascal-second (mPa·s) at 25° C.

The above-described resin solution (150 parts), ethylene glycol (36 parts), tetramethylenesulfone (6 parts), purified water (158 parts) and sodium hydroxide (0.2 part) were then thoroughly mixed, to which 150 parts of a black pigment ("Colour Black S-170", trade name; product of Degussa Japan Co., Ltd.) were mixed under stirring so that a mill base was prepared. Using a "250 ml Minimotor Mill" (trade name; manufactured by EIGER ENGINEERING, LTD.), the mill base was processed under the following conditions: glass bead diameter, 0.5 mm; and revolution speed, 3,000 rpm. Purified water (250 parts) was added further to the above-processed mill base, whereby an aqueous pigment dispersion having a pigment content of 20% was obtained.

To 100 parts of the above-described aqueous pigment dispersion, a mixture consisting of 34.5 parts of ethylene glycol, 16.0 parts of glycerin, 4.5 parts of tetramethylenesulfone and 111.5 parts of purified water was added to dilute the dispersion. The diluted dispersion was subjected to centrifugation at 8,000 rpm for 20 minutes, whereby coarse particles mixed in the diluted dispersion were removed. The diluted dispersion was then filtered through a 5-μm membrane filter, thereby obtaining a water-based pigment ink having a viscosity of 3.14 mPa·s, a surface tension of 44.9 mN/m, a pH of 6.68 and an average pigment particle size of 113 nm.

The water-base pigment ink was filled in an ink-jet printer ("IO-735X", trade name; manufactured by Sharp Corp.), and printing was performed on "Xerox 4024 Paper" sheets and "Canon PB Paper" sheets. The densities of printed marks were measured by a Macbeth densitometer ("TR918"). The print density was 1.28 in the case of the "Xerox 4024 Paper" sheets and 1.35 in the case of the "Canon PB Paper" sheets. The printed marks were visually evaluated for print density irregularity and edge definition. Solid-printed parts had high regularity in density, and the edges of the printed marks were well-defined without feathering or blurring.

EXAMPLE 7

Fumaric acid (464 parts), bisphenol A-dihydroxy-ethyl ether (1,580 parts), phthalic anhydride (296 parts) and paratoluenesulfonic acid (6.6 parts) were placed in a reaction vessel. Under nitrogen gas stream, they were subjected to a condensation reaction at 150° C. for 90 minutes and then at 175° C. for 3 hours to synthesize a polyester resin. The thus-synthesized resin was taken out of the reaction vessel. The resin (220 parts), water (595 parts) and 28% aqueous ammonia (20 parts) were placed in a reaction vessel, followed by stirring at 65° C. for 90 minutes. As a result, a viscous milky white resin dispersion was obtained. Acid sodium sulfite (41.6 parts) was added to the resin dispersion. The resultant mixture was stirred at 95° C. for 6 hours, whereby the resin was sulfonated and a clear resin solution was obtained. The resin solution had a resin content of 30%. The viscosity of the resin solution was 5,300 mPa·s at 25° C.

The above-described resin solution (150 parts), ethylene glycol (40 parts), purified water (160 parts) and sodium hydroxide (1.5 parts) were then thoroughly mixed, to which 150 parts of a black pigment ("Raven 2500 Powder(U)", trade name; product of Columbian Carbon Japan, Ltd.) were mixed under stirring so that a mill base was prepared. Dispersion of this mill base was then conducted in a similar manner as in Example 1. Purified water (250 parts) was added to the resultant mill base, whereby an aqueous pigment dispersion having a pigment content of 20% was obtained.

To 100 parts of the aqueous pigment dispersion, a mixture consisting of 51.0 parts of ethylene glycol, 33.0 parts of glycerin, 1.0 part of polyoxyethylene-oleate ester, 0.8 part of a surfactant ("Surfynol 82", trade name; product of Air Products and Chemicals, Inc.) and 212.0 parts of purified water was added to dilute the dispersion. The diluted dispersion was subjected to centrifugation at 8,000 rpm for 20 minutes, whereby coarse particles remaining in the diluted dispersion were removed. The diluted dispersion was then filtered through a 5-μm membrane filter, whereby a black ink was obtained. The results of various physical property tests of the ink were all good as will be shown below in Table 1.

EXAMPLE 8

The resin solution synthesized in Example 7 (300 parts), ethylene glycol (105 parts), tetramethylenesulfone (30 parts), purified water (615 parts) and sodium hydroxide (0.6 part) were thoroughly mixed. Under stirring, 350 parts of the resultant mixture and 150 parts of Pigment A shown below in Table 1 were mixed to prepare a mill base. Dispersion of this mill base was then conducted in a similar manner as in Example 1. Purified water (250 parts) was added to the resultant mill base, whereby an aqueous pigment dispersion having a pigment content of 20% was obtained. Pigment dispersions of Pigments B, C and D in Table 1, each of said pigment dispersions having a pigment content of 20%, were also obtained likewise.

To 100 parts of each pigment dispersion, a mixture consisting of 52.0 parts of ethylene glycol, 33.0 parts of glycerin, 11.0 parts of sulfolane, 4.0 pats of polyoxyethylene alkylene ether sulfate ester salt, 0.8 part of the surfactant ("Surfynol 82") and 200.0 parts of purified water was added to dilute the dispersion. The diluted dispersion was subjected to centrifugation at 8,000 rpm for 20 minutes, whereby coarse particles were removed from the diluted dispersion. The diluted dispersion was then filtered through a 5-μm membrane filter. In this manner, black, yellow, cyan and magenta inks were obtained. The results of various physical property tests of the individual inks were all good as shown below in Table 1.

TABLE 1

| Used pigment | A | B | C | D |
| --- | --- | --- | --- | --- |
| Average particle size (mm) | 108 | 152 | 119 | 151 |
| Surface tension of ink (mN/m) | 42.9 | 42.9 | 42.6 | 42.4 |
| Record density | 1.48 (Good) | 0.88 (Good) | 1.05 (Good) | 1.12 (Good) |
| Viscosity of ink (mPa.s) | 2.88 | 2.57 | 2.46 | 2.66 |
| Dispersion stability of pigment | Good | Good | Good | Good |
| pH of ink | 7.07 | 7.38 | 7.24 | 6.89 |
| Printability | Good | Good | Good | Good |

A: Black pigment ("Raven 2500 Powder(U)", trade name)
B: Yellow pigment ("Seika Fast Yellow A3", trade name)
C: Blue pigment ("Cyanine Blue KBM", trade name)
D: Red pigment ("Chromo Fine Magenta 6887", trade name)

The above-described inks were separately filled in an ink-jet printer ("BJ-410J", trade name; manufactured by Canon Inc.), and printing was performed on synthetic ink-jet paper sheets ("Nasukachekku Paper", trade name; product of Sakurai Co.). The densities of printed marks were measured by a Macbeth densitometer ("TR918"). The printability was evaluated by determining whether or not the printed marks had feathering and/or blurring.

EXAMPLE 9

The resin solution (resin content: 30%) obtained in Example 6 (100 parts), water (500 parts) and copper phthalocyanin blue ("ZCA901", trade name; product of Dainichiseika Color & Chemicals Mfg. Co., Ltd.) (400 parts) were subjected to dispersion processing for 20 hours in a porcelain ball mill, whereby an aqueous blue pigment dispersion was obtained. Further, the resin solution obtained in Example 6 (240 parts), hydroxy-ethylcellulose (12 parts), water (448 parts) and rutile-type titanium white (1,300 parts) were subjected to dispersing processing for 10 hours, whereby an aqueous white pigment dispersion was obtained. Mixed were 250 parts of a water-dispersion-type alkyd resin ("RESYDROL VWA5477", trade name; resin content: 40%; product of Hoechst Industry Limited), 150 parts of the aqueous white pigment dispersion, 12.5 parts of the aqueous blue pigment dispersion, and 28 parts of a melamine crosslinking agent ("Cymel 370", trade name; solid content: 88%; product of Mitsui Cytec, Ltd.). The resultant mixture was stirred so that a water-based paint was obtained. The paint (100 parts) was diluted with water (20 parts) and was then spray-coated on a tinned sheet-iron. After the paint was dried in air, it was baked at 140° C. for 30 minutes. The thus-obtained obtained coated iron-sheet had a glossy vivid blue color. The coated iron-sheet was immersed for 30 minutes in boiling water, but no changes were observed on its coating film.

EXAMPLE 10

The resin solution (resin content: 30%) obtained in Example 6 was coated to a thickness of 50 μm on a wood plate. A plain weave fabric of polyester fibers was applied extending over the thus-coated resin solution. The resin solution did not penetrate to an upper side of the fabric. Using a color paste for pigment printing in a manner known per se in the art, the wood plate printed by screen process. After the printing, the color paste was dried, followed by heating at 150° C. for 10 minutes. Pouring of water over the printed part made it possible to peel off the fabric with ease. The thus-obtained print has well-defined edges.

COMPARATIVE EXAMPLE 1

Bisphenol A-dihydroxyethyl ether (213.6 parts), pyromellitic anhydride (86.4 parts) and diethylene glycol dimethyl ether (150 parts) were placed in a reaction vessel, and were then reacted at 150° C. for 6 hours under stirring. The reaction mixture was cooled to 80° C., followed by the addition of a mixed solution consisting of water (502 parts) and 28% aqueous ammonia (in an amount required for neutralization). Under stirring, a neutralization reaction was conducted for 10 minutes. The solid content and viscosity of the thus-obtained resin solution were 30% and 2,400 cps, respectively. The acid value and number average molecular weight of the resin before the neutralization were 148 and 2,270, respectively.

Using a horizontal disperser with a tumbling medium contained therein, 120 parts of the above-described resin solution, 300 parts of water, 120 parts of carbon black and 200 parts of diethylene glycol were processed to thoroughly disperse the pigment (i.e., carbon black). Water (260 parts) was added to the resultant dispersion, followed by thorough stirring. Coarse particles were removed from the dispersion by an 5ultracentrifugal separator, whereby a water-based pigment ink was obtained. When this water-based pigment ink was stored at 50° C., its viscosity increased so that flowability was lost in 2 weeks.

REFERENTIAL EXAMPLE 1

Using 30 parts of azobisisobutyronitrile as a polymerization initiator and 700 parts of propylene glycol monoethyl ether as a polymerization solvent, 200 parts of styrene, 300 parts of ethyl methacrylate, 150 parts of 2-ethylhexyl methacrylate, 100 parts of diacetone acrylamide and 250 parts of methacrylic acid were polymerized at 130° C. After completion of the polymerization, the resultant polymer solution was cooled to 80° C. A mixed solution consisting of 180 parts of 25% aqueous ammonia and 300 parts of water was added, and a neutralization reaction was then allowed to proceed fully under stirring. Water (300 parts) were then added further, whereby a resin solution having a solid content of 40% and a viscosity of 3,600 cps was obtained.

After 70 parts of the above-described resin solution, 280 parts of water, 200 parts of diethylene glycol, 5 parts of benzotriazole, 5 parts of diethanolamine and 100 parts of carbon black were mixed, the pigment (i.e., carbon black) was thoroughly dispersed in a horizontal disperser with a tumbling medium contained therein. Water (340 parts) and diethylene glycol (100 parts) were then added, followed by thorough stirring. Coarse particles were removed from the resultant dispersion by an ultracentrifugal separator, whereby a water-based pigment ink was obtained. Its viscosity was 4.1 cps.

Using a ball-point pen filled with the above water-based pigment ink, characters were written on a wood free paper sheet. The density of the handwriting was insufficient, and blurring was observed.

REFERENTIAL EXAMPLE 2

After 36 parts of a condensation product of sodium naphthalenesulfonate and formaldehyde, 329 parts of water, 200 pats of diethylene glycol, 5 parts of benzotriazole and 120 parts of carbon black were mixed, the pigment (i.e., carbon black) was thoroughly dispersed in a horizontal disperser with a tumbling medium contained therein. Water (310 parts) were then added, followed by thorough stirring. Coarse particles were removed from the resultant pigment dispersion by an ultracentrifugal separator, whereby a water-based pigment ink was obtained.

Using a ball-point pen filled with the above water-based pigment ink, characters were written on a wood free paper sheet. The writing comfort was somewhat poor. When the handwriting was immersed in water immediately after the writing, dissolution of carbon black was observed.

We claim:

1. An aqueous pigment dispersion comprising a pigment, an aqueous medium and a dispersant resin, wherein said dispersant resin comprises a polymer consisting essentially of a hydrophobic moiety and a hydrophilic moiety in its molecule, said hydrophobic moiety consists essentially of a polyester linkage chain, and said hydrophilic moiety consists essentially of a water-soluble moiety containing sulfonic groups or sulfonate salt groups represented by the following formula (I) as water soluble groups in a backbone side chains of said polymer:

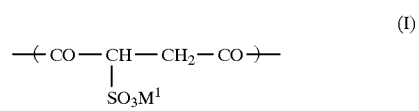

wherein $M^1$ represents a hydrogen atom, an alkali metal, an ammonium group or a $C_{1-4}$ aliphatic quaternary ammonium group.

2. The dispersion of claim 1, wherein said dispersant resin has a number average molecular weight of from 600 to 10,000.

3. The dispersion of claim 1, wherein the concentration of said pigment ranges from 0.5 to 50 wt. % and that of said dispersant resin ranges from 1 to 25 wt. %.

4. The dispersion of claim 1, wherein the content of said sulfonic groups or said sulfonate salt groups in said dispersant resin ranges from 3 to 30 wt. % based on the resin.

5. The aqueous pigment dispersion according to claim 1, wherein said dispersant resin is a water-soluble resin prepared by reacting a polyol with maleic acid and/or fumaric acid to prepare an unsaturated polyester resin, and then adding sulfurous acid or a salt thereof to said unsaturated polyester resin.

6. The dispersion of claim 5, wherein said dispersant resin has a molecular weight of from 600 to 10,000.

7. The dispersion of claim 5 wherein the concentration of said pigment ranges from 0.5 to 50 wt. % and that of said dispersant resin ranges from 1 to 25 wt. %.

8. The dispersion of claim 5, wherein the content of sulfonic groups or sulfonate salt groups in said dispersant resin ranges from 3 to 30 wt. % based on the resin.

* * * * *